Patented Feb. 7, 1933

1,896,659

UNITED STATES PATENT OFFICE

ANDREW F. BIGGER, OF NEW YORK, N. Y., ASSIGNOR TO RUBBER PROCESS CORPORATION, OF NEW YORK, N. Y., A CORPORATION OF MICHIGAN

COMPOSITION OF MATTER

No Drawing. Application filed January 27, 1923, Serial No. 615,380. Renewed July 14, 1932.

This invention relates to a composition of matter for, and a process of, treating rubber, and has as an object the production of a composition of matter adapted for improving the general characteristics and quality of rubber and manufactures of rubber.

Another object is the production of a composition of matter, hereinafter referred to as the composition, capable of rendering rubber articles manufactured under its influence non-blooming, the articles having been fabricated from stock commonly known as "blooming" stock, i. e., a stock that gives an article which, within a short period of time, will have upon its surface a grayish deposit, known as "bloom".

A further advantage pertaining to the use of the composition is the production of rubber products from plantation rubbers, such as smoked sheet and pale crepe, which shall approximate in general characteristics products obtained from wild rubbers, as Bolivian fine, and Up-River fine.

Additional objects of the invention are to increase the elasticity and durability, to retard deterioration, to improve aged rubber articles by applying the composition preferably in the form of a solution to the surface of such articles, and to devulcanize rubber.

Other objects of the invention will be in part obvious and will in part appear hereinafter.

The invention accordingly comprises a composition of matter possessing the characteristics, properties and the relation of constituents, and the several steps and the relation and order of one or more of such steps with respect to each of the others thereof, which will be exemplified in the composition and in the process hereinafter described and the scope of the application of which will be indicated in the claims.

My composition for accomplishing the objects of the invention may contain a basic substance, i. e., not only compounds having an alkaline reaction with litmus, but those which have the property of combining with acids, such as sodium bicarbonate, potassium bicarbonate, ammonium bicarbonate, sodium carbonate, ammonium carbonate, potassium carbonate, calcium bicarbonate, magnesium bicarbonate, sodium and potassium phosphates, sodium borate, the hydroxides of the alkali and alkaline earth metals, basic salts, as basic chloride of magnesium, basic lead carbonate, antimony oxychloride, basic carbonate of copper, copper ammonium salts, organic bases—for instance, ethylamine, trimethylamine, alphanaphthylamine, pyridine, and quinoline—etc.; sea salt, and a carbohydrate, for example, gum acacia, sucrose, glucose, lactose, soluble starch, gum tragacanth, agar-agar, dextrine, but not including cellulose.

It has been ascertained that through the employment of the composition for the treatment of rubber before, during and/or subsequent to vulcanization, the general characteristics and quality of the rubber products are improved, namely, the products from any stock possess greater elasticity, durability and strength, deterioration is less rapid, and "blooming" is prevented or retarded, and if plantation rubber is used its quality appears to be raised to that which wild rubber alone has heretofore possessed. In fact, it has been learned that vulcanized products treated with the composition not only have deterioration retarded, but improve in quality over a period of time, as is also the case with restored articles.

A suitable procedure for the use of the composition is to dissolve it in a desired solvent, and for practical purposes I prefer to use water, pure or sea. In the event that sea-water is the solvent, the sea-salt may be omitted wholly or in part.

The composition may be utilized as a solution not only for treating vulcanized articles as described herein, but also in various other methods for the production of rubber articles and if so desired in devulcanization. However, devulcanization treatments are not specifically described nor specifically claimed herein, forming as they do the subject matter of a co-pending application filed jointly by myself and Arthur C. Squires, Serial Number 615,729, filed January 29, 1923.

While the constituents may be varied in amount in order that the composition may be most suitably adapted for a given treatment, as examples of such compositions I have found that advantageous results may be obtained with a mixture consisting of four parts of a basic compound to one part of a polyose for after vulcanizing treatment.

As an illustrative embodiment of a mode by which the invention may be employed in practice, the following example, setting forth the use of the composition in a process for the treatment of vulcanized rubber articles by what I term the "dipping process" is given.

To the surface of a vulcanized rubber article, such as hot water bags, inner tubes, air-brake hose, surgical catheters, automobile tires, elastic thread, etc., is applied a solution containing two ounces of sodium bicarbonate, one-half ounce gum acacia, and if desired, one-half ounce sea salt, per gallon. The application is preferably made by placing a desired volume of the solution in a receptacle of sufficient size and introducing the vulcanized rubber article therein. The article may remain in the solution for a period of time which depends and varies widely, upon the goods undergoing treatment; for instance, five minutes suffices for elastic thread, whereas aged tires may be treated twenty-four hours; after which it is withdrawn and the adherent solution allowed to dry on the surface. Particularly satisfactory results will be obtained when use of the article is delayed for a period of about one month, whereupon it will possess the superior qualities hereinbefore mentioned.

It is to be understood that the term "sea salt" as used hereinbefore throughout the description, and hereinafter in the claims, signifies either the natural product or a compounded mixture of the principal constituents of the natural product.

The chemical reactions, if occurring, by which the rubber under treatment is affected, are probably complex and involved. Thus far, it has not been possible to understand or explain in detail the precise manner of molecular or other change which the rubber undergoes in the treatments described. It may be that the composition of matter affects the intermolecular arrangement, or that the relationship between the sulphur and the rubber molecule is affected so that the properties thereof are improved, and then it may be that the composition of matter itself enters into combination with the rubber molecules, giving entirely new compounds. However, it is not necessary in the practice of the invention that the theoretical principles and factors involved be comprehended, inasmuch as by following the steps and using the composition of matter as set forth herein the definite and improved results may be obtained, and thus the objects and advantages of the invention may be achieved.

Since certain changes may be made in the above composition of matter and different embodiments of the invention could be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. A rubber treating composition, including four parts of sodium bicarbonate and one part of gum acacia.

2. A composition for the treatment of vulcanized rubber, including sodium bicarbonate and a gum of the class consisting of gum acacia and gum tragacanth.

3. A composition for the treatment of vulcanized rubber, including sodium bicarbonate and gum acacia.

4. A rubber treating composition consisting of sodium bicarbonate, gum acacia and sea salt.

5. In the treatment of rubber, the process which comprises subjecting vulcanized rubber to the beneficial effects of a composition of matter containing gum acacia and a basic substance, said basic substance comprising an acid salt of an alkali metal.

6. In the treatment of rubber, the process which comprises subjecting vulcanized rubber to the beneficial effects of a composition of matter containing a gum of the class consisting of gum acacia and gum tragacanth, a basic substance, and sea salt.

7. In the treatment of rubber, the process which comprises subjecting vulcanized rubber goods to the beneficial action of a composition of matter containing gum acacia and sodium bicarbonate.

8. In the treatment of rubber, the process which comprises subjecting vulcanized rubber goods to the beneficial action of a composition of matter containing a gum, a basic substance, and sea salt.

9. A treatment of rubber which comprises applying to the surface of vulcanized rubber goods a solution of a composition of matter containing gum acacia, sodium bicarbonate, and sea salt.

10. A treatment of rubber which comprises applying to the surface of vulcanized rubber goods a solution of a composition of matter containing gum acacia and sodium bicarbonate.

11. A treatment of vulcanized rubber which comprises immersing vulcanized rubber goods in a solution of a composition of matter containing a carbohydrate and a basic substance, allowing it to remain therein for a period of time, removing, and permitting the solution to dry thereon.

12. A treatment of vulcanized rubber which comprises immersing vulcanized rubber goods in a solution of a composition of matter containing one part of a carbohydrate and four parts of a basic substance, allowing it to remain therein for a period of time, removing, and permitting the solution to dry thereon.

13. In the treatment of rubber, the process which comprises subjecting vulcanized rubber to the beneficial effects of a composition of matter containing gum acacia and sodium bicarbonate.

14. A process for the treatment of vulcanized rubber, which comprises immersing vulcanized rubber goods in a liquid medium containing sodium bicarbonate and gum acacia.

15. A process for the treatment of vulcanized rubber, which comprises immersing vulcanized rubber goods in a solution containing sodium bicarbonate and gum acacia, allowing it to remain therein for a period of time, removing, and permitting the solution to dry thereon.

16. A process for the treatment of vulcanized rubber, which comprises immersing vulcanized rubber goods in a solution of a composition containing one part of gum acacia and four parts of sodium bicarbonate, allowing it to remain therein for a period of time, removing, and permitting the solution to dry thereon.

17. In the treatment of rubber, the process which comprises subjecting vulcanized rubber to the beneficial effects of a composition of matter containing sodium bicarbonate, and a gum of the class consisting of gum acacia and gum tragacanth.

In testimony whereof I affix my signature.

ANDREW F. BIGGER.